US009590808B2

(12) United States Patent
Jiang et al.

(10) Patent No.: US 9,590,808 B2
(45) Date of Patent: Mar. 7, 2017

(54) OBFUSCATED PASSWORDS

(71) Applicant: International Business Machines Corporation, Armonk, NY (US)

(72) Inventors: Tao T T Jiang, Shanghai (CN); George J. Romano, Rochester, MN (US); Guo Xin Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/562,796

(22) Filed: Dec. 8, 2014

(65) Prior Publication Data

US 2016/0164681 A1  Jun. 9, 2016

(51) Int. Cl.
*H04L 29/06* (2006.01)
*H04L 9/32* (2006.01)

(52) U.S. Cl.
CPC ........ *H04L 9/3226* (2013.01); *H04L 2209/04* (2013.01)

(58) Field of Classification Search
CPC ... G06F 21/316; H04L 63/0838; H04L 29/06; H04L 9/3226; H04L 2209/04
See application file for complete search history.

(56) References Cited

U.S. PATENT DOCUMENTS

| | | | |
|---|---|---|---|
| 5,475,762 A * | 12/1995 | Morisawa | G06F 21/31 358/1.15 |
| 5,731,575 A | 3/1998 | Zingher et al. | |
| 6,954,862 B2 * | 10/2005 | Serpa | G06F 21/316 713/183 |
| 7,552,467 B2 | 6/2009 | Lindsay | |
| 7,602,384 B2 | 10/2009 | Rosenberg et al. | |
| 8,301,899 B2 * | 10/2012 | Millar | G06F 21/31 713/183 |

(Continued)

OTHER PUBLICATIONS

Huang, Chun-Ying, Shang-Pin Ma, and Kuan-Ta Chen. "Using one-time passwords to prevent password phishing attacks." Journal of Network and Computer Applications 34.4 (2011): 1292-1301.*

(Continued)

*Primary Examiner* — Chau Le
*Assistant Examiner* — Muhammad Chaudhry
(74) *Attorney, Agent, or Firm* — Mark G. Edwards (57) ABSTRACT

A method for obfuscating an electronic password can include receiving at least a first symbol of a first password, wherein the first password has a plurality of symbols. Next, a second password (the obfuscated password) can be generated, the second password being derived from the first password using an obfuscation rule, wherein the second password includes the symbols of the first password and at least one obfuscating symbol generated from a first symbol of the first password (generating symbol) and the obfuscation rule. It can then be determined whether to provide a feedback indicator. A feedback indicator can be provided, in response to determining to provide the feedback indicator, wherein the feedback indicator corresponds with an instruction to enter an obfuscating symbol according to the obfuscating rule, the obfuscating symbol being from the second password. Finally, access can be granted to a session in response to receiving the second password.

6 Claims, 4 Drawing Sheets

(56) References Cited

U.S. PATENT DOCUMENTS

| | | | | |
|---|---|---|---|---|
| 9,030,293 | B1* | 5/2015 | Tabak | G06F 21/30 |
| | | | | 340/5.54 |
| 9,077,711 | B2* | 7/2015 | McCown | G06F 21/31 |
| 2005/0080677 | A1* | 4/2005 | Foss, Jr. | G06F 21/31 |
| | | | | 705/16 |
| 2014/0245380 | A1* | 8/2014 | Jakobsson | G06F 21/31 |
| | | | | 726/1 |

OTHER PUBLICATIONS

Mannan, Mohammad, and Paul C. van Oorschot. "Digital Objects as Passwords." HotSec. 2008.*

Anonymous, "Permutable Keypads", IP.com Prior Art Database Technical Disclosure, IP.com No. IPCOM000200336D, Oct. 6, 2010. http://ip.com/IPCOM/000200336.

Bianchi et al., "The Phone Lock: Audio and Haptic Shoulder-Surfing Resistant PIN Entry Methods for Mobile Devices", TEI '11: Proceedings of the 5th International Conference on Tangible, Embedded and Embodied Interaction 2011, Portugal, Jan. 22-26, 2011, Copyright 2011 ACM.

Lee et al., "Secure and Usable PIN-Entry Method with Shoulder-Surfing Resistance", HCI International 2013—Poster's Extended Abstracts, Part II, Communications in Computer and Information Science, 2013, vol. 374, pp. 745-748, Springer Berlin Heidelberg, © 2013 Springer-Verlag Berlin Heidelberg. DOI: 10.1007/978-3-642-39476-8_149.

* cited by examiner

OBFUSCATED PASSWORDS

BACKGROUND

The present disclosure relates to password systems, and more specifically, to a method and system of obfuscating an electronic password.

Passwords may be used to authenticate a user's access to a protected resource. According to various embodiments, a password may include a sequence of symbols known to both a user requesting access to the protected resource and a system configured to authenticate the user and grant access to the protected resource. Examples of protected resources include a bank account accessed at a public automatic teller machine (ATM), the contents of a locked cellular phone, and an email account accessed on a public computer. The security of the protected resource depends on the fact that the password granting access to the protected resource resides in the sole possession of a user having a legitimate right to access the resource. When a third party not having a legitimate right to access a protected resource obtains the password, the security of the resource may have to be reestablished by invalidating the compromised password and sharing a new one between the legitimate user and the authenticating system.

SUMMARY

According to embodiments of the present disclosure, a method for obfuscating an electronic password can include receiving at least a first symbol of a first password, wherein the first password has a plurality of symbols. Next, a second password (the obfuscated password) can be generated, the second password being derived from the first password using an obfuscation rule, wherein the second password includes the symbols of the first password and at least one obfuscating symbol generated from a first symbol of the first password (generating symbol) and the obfuscation rule. It can then be determined whether to provide a feedback indicator. A feedback indicator can be provided, in response to determining to provide the feedback indicator, wherein the feedback indicator corresponds with an instruction to enter an obfuscating symbol according to the obfuscating rule, the obfuscating symbol being from the second password. Finally, access can be granted to a session in response to receiving the second password.

According to various embodiments, a system is provided for obfuscating an electronic password. The system can include a password obfuscating module configured to: receive at least a first symbol of a first password, wherein the first password has a plurality of symbols; generate a second password derived from the first password using an obfuscation rule, wherein the second password includes the symbols of the first password and at least one obfuscating symbol generated from a first symbol of the first password (generating symbol) and the obfuscation rule. The system may also include a password validating module configured to: determine whether to provide a feedback indicator; provide, in response to determining to provide the feedback indicator, the feedback indicator, wherein the feedback indicator corresponds with an instruction to enter an obfuscating symbol according to the obfuscating rule, the obfuscating symbol being from the second password, and grant access to a session in response to receiving the second password.

Various embodiments are directed toward a computer program product for obfuscating an electronic password, the computer program product comprising a computer readable storage medium having program instructions embodied therewith, wherein the computer readable storage medium is not a transitory signal per se, the program instructions executable by a processing circuit to cause the processing circuit to perform a method comprising: receiving at least a first symbol of a first password, wherein the first password has a plurality of symbols; generating a second password derived from the first password using an obfuscation rule, wherein the second password includes the symbols of the first password and at least one obfuscating symbol generated from a first symbol of the first password (generating symbol) and the obfuscation rule, determining whether to provide a feedback indicator; providing, in response to determining to provide the feedback indicator, the feedback indicator, wherein the feedback indicator corresponds with an instruction to enter an obfuscating symbol according to the obfuscating rule, the obfuscating symbol being from the second password; and granting access to a session in response to receiving the second password.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to passwords systems and more particular aspects relate to a method and system of obfuscating an electronic password. While the present disclosure is not necessarily limited to such applications, various aspects of the disclosure may be appreciated through a discussion of various examples using this context.

Embodiments of the present disclosure are based on the recognition that accessing protected resources may require entry of confidential user credentials, including a password, in public (e.g., on a cellular phone, ATM, or public computer). Submitting passwords in public environments to gain access to the resources they protect creates the possibility that the user passwords may be discovered by third party surveillance. For example, a user entering password at an ATM could unintentionally expose his password to a video recording device targeted at the keypad, or third party looking over his shoulder. This exposure can require users to go out of their way to conceal the fact that they are entering a password. Even when the user is careful to obscure his key strokes from cameras and the third party onlookers, password input can still be vulnerable to other surveillance techniques, including keystroke logging and finger print lifting.

Embodiments of the present disclosure are directed towards a method and system for obfuscating an electronic password to secure it from public surveillance. Obfuscating a password may include inserting one or more symbols into a password sequence at varying symbol positions. The obfuscated password ("second password") may include the original password interspersed with a sequence of obfuscating symbols. According to various embodiments, a new obfuscated password may be generated for each session access (e.g., each time a user's request for access to a protected resource is authenticated with a password).

According to various embodiments, an obfuscated password can be generated in response to a request to access a protected resource. The request may include receiving user credentials such as a username, account number, or a user password. In certain embodiments, the obfuscated password may be generated after receiving a subset of a user's password. Generating the obfuscated password may include retrieving a stored copy of a user's password ("first password"), and adding one or more obfuscating symbols to the retrieved password according to an obfuscation rule (hereinafter "rule"). The stored password and rule may be known only to the user requesting access to the protected resource, and stored on the system in an account associated with the user. According to some embodiments, the user may create an obfuscation rule when he creates an account in the system. This may allow a user to choose or create a rule that is easy for him to remember (e.g., he may choose a familiar date, number or operation in the rule). In particular embodiments, the rule may be assigned to the user and delivered to him by, for example, mail or telephone.

An obfuscation rule may specify a relationship between the symbols of a stored password and the sequence of obfuscating symbols used to generate the obfuscated password ("second password"). For example, when the symbols of a stored password are numeric characters, an obfuscation rule may dictate that an obfuscating symbol is generated from a password character by adding an offset or constant to the canonical value to that character. Thus, if a password sequence is "1234" and the rule specifies that obfuscating symbols are generated by "adding 5" to selected characters, then the obfuscating symbol derived from the '2' in the sequence will be '7'. The same logic may be used for passwords whose symbols include alphanumeric characters. For example, given the alphanumeric password sequence "ABCD1" and the obfuscation rule from the previous example, an obfuscating symbol can be derived from the 'A' by offsetting the character by 5 character spaces, producing an 'F.'

According to some embodiments, a modulus may be included in the obfuscation rule. For example, if the symbols of a password are the numeric character 0-9, an obfuscation rule may dictate that the encrypting symbol is derived from a given password character by adding 5 modulo 10. Thus, the obfuscating symbol for password character '9' would be '4' ('14' modulo '10' is '4'). The obfuscation rule may include any combination of mathematical or algorithmic expression, such as addition, subtraction, multiplication, and modulus operations. In some embodiments, the obfuscation rule may dictate that a set of obfuscating symbols can be derived from a single password symbol. For example, an obfuscation rule may dictate that for the password symbol "B", a first obfuscating symbol may be generated by "adding 5" to "A" to produce "F", and a second obfuscating symbol may be generated by "adding 7" to "A" to produce "H". In particular embodiments, multiple obfuscation rules may be used to generate obfuscating symbols for a given user's passwords. For example, a first obfuscation rule may dictate that a first obfuscating symbol may be derived from a first symbol of a user's password by "adding 2" to the first symbol of the user's password, while a second obfuscation rule may dictate that a second obfuscating symbol may be derived from a second symbol of a user's password by "subtracting 4". According to other embodiments, a different obfuscation rule may be employed to obfuscate a user's password for each session access. For example, the rule for a first session access may be "subtract 2", while the rule for a second session may be "subtract 4".

In some embodiments, obfuscating symbols can be inserted into the password at the next symbol position following the password symbol used to generate the obfuscating symbol. The password symbol used to generate the obfuscating symbol can be referred to as the generating symbol. In particular embodiments, the generating symbol may be a previously inserted obfuscating symbol. A unique set of generating symbols may be determined for each session access. In some embodiments, the set of generating symbols may be determined by a random or pseudo random function such that a unique set of generating symbols may be randomly or pseudo randomly determined for each session access. In other embodiments, alternative algorithms, such as statistical and probabilistic functions, may be used to determine a unique set of generating symbols for each session access.

According to various embodiments, a feedback indicator can be provided to prompt a user requesting access to a session to supplement the password sequence by inputting an obfuscating character. The feedback indicator may include an output from the system generated in response to receiving a symbol of the user's password sequence, where the received symbol is also a member of the set of generating symbols determined for the session. The feedback indicator may include tactile or haptic feedback such as vibrating or shaking an input device, visual feedback such as displaying an image or a symbol on a display device, and auditory feedback such as a tone or audio recording. In particular embodiments, the feedback indicator may only be perceivable by the user. The feedback indicator may prompt the user to apply an encryption rule to the last character entered, and input the resulting obfuscating character. A feedback indicator may be provided for each symbol in the set of generating symbols.

According to various embodiments, the system may grant access to a session after receiving the stored password obfuscated by the obfuscating symbols.

Figure 1:
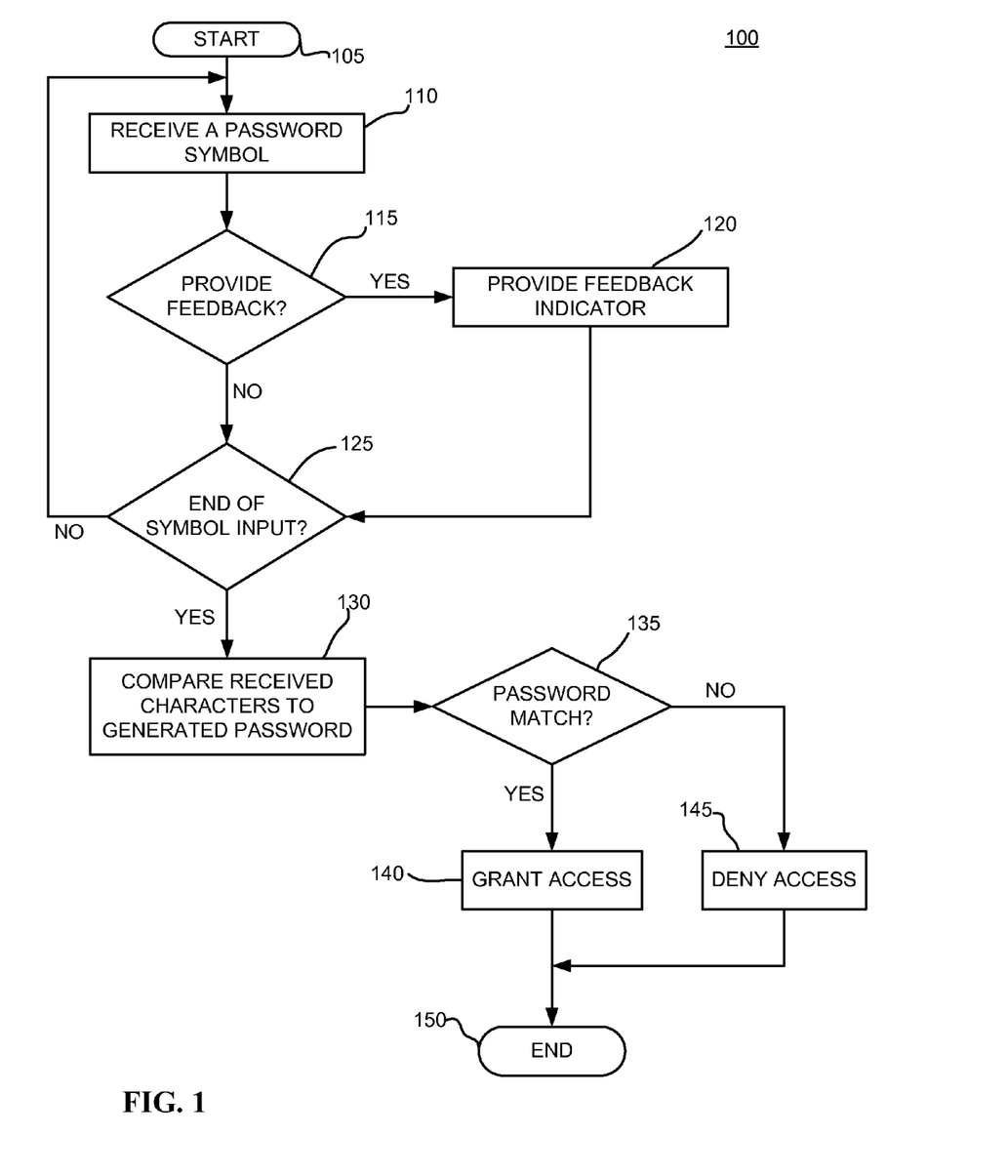
FIG. 1 depicts a flowchart of a method for obfuscating an electronic password, according to various embodiments.

Turning now to the figures, FIG. 1 depicts a flowchart of a method 100 for obfuscating an electronic password, according to various embodiments. In some embodiments, the method 100 may be performed by a computing system, such as the computer described herein in reference to FIG. 4. The method may begin at block 105 with a session access request. The request may include activating an input device, or receiving user credentials, such as an identifier or account number, input by a user. According to particular embodiments, the session access request may also include receiving, as input from the user, a symbol of a stored password, consistent with block 110. After receiving a symbol of the password, the system may determine whether to provide a feedback indicator, consistent with the method step shown in block 115. The system determines whether to provide a feedback indicator by searching for the received symbol in the sequence of obfuscating symbols associated with the session access. In some embodiments, the sequence of obfuscating symbols may be determined at the beginning of the session access. In other embodiments, a symbol in the sequence of obfuscating symbols may be determined each time an input symbol is received. According to various embodiments, a symbol in the sequence of obfuscating symbols may be identified by the symbol's canonical value and position in the obfuscated password sequence. If the received character is in the set of encrypting symbols, the system may provide a feedback indicator as shown in step 120.

The system may proceed to the method step shown in block 125 if no feedback indicator is provided, or after providing the feedback indicator. At the method step shown in block 125, the system may determine whether the password symbol input has ended. Determining that symbol input has ended can include determining that the sequence of password symbols was received, or it may include receiving an indicator that input is complete (e.g., the user may press "ENTER" or "SUBMIT" on the input device). If the input is not finished, the method may proceed to block 110 and repeat the steps showing in blocks 110, 115, 120 and 125 as described in this disclosure. If the input is complete, the system may proceed to the method step shown in block 130 where the received sequence of password symbols can be compared against an obfuscated password derived from the user's stored password and obfuscation rule. In the next method step, the system may then determine whether the two passwords match, consistent with block 135. The system may then proceed to the method step shown in block 140 where it grants access to the session if the passwords match. If the passwords do not match, the system may deny access to the session, consistent with the method step illustrated in block 145. The method ends at block 150.

Figure 2:
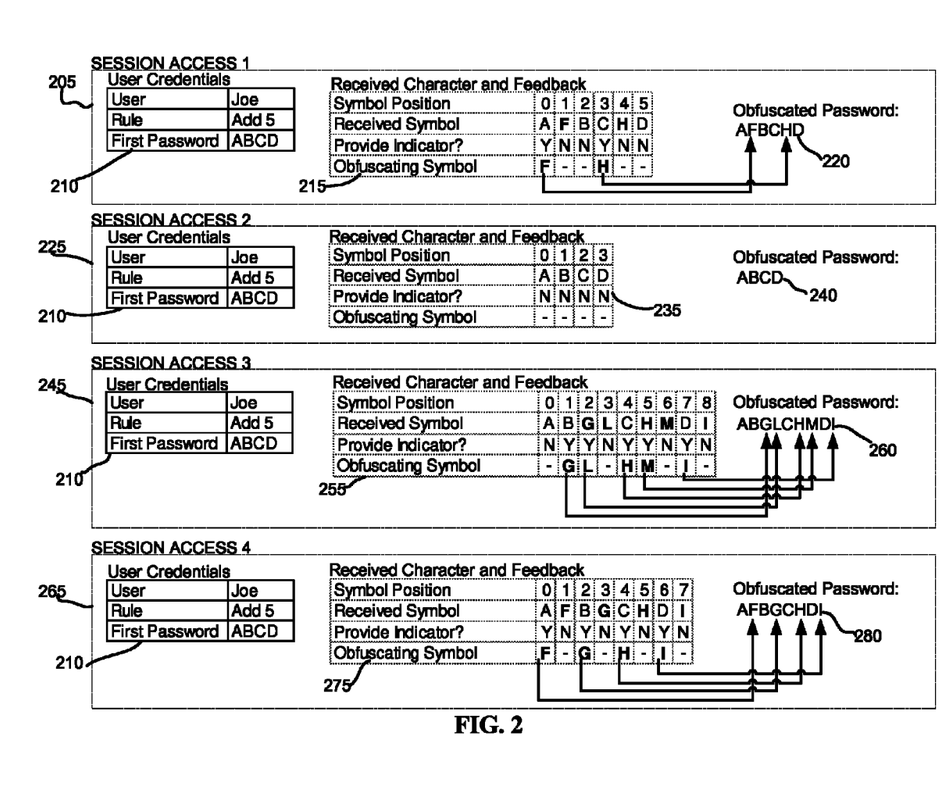
FIG. 2 illustrates the obfuscation of a password during four distinct session accesses of a protected resourced, according to various embodiments.

FIG. 2 illustrates the obfuscation of a password during four distinct session accesses of a protected resource, according to various embodiments. A first session access 205 includes a user credentials table 210, a received symbol and feedback table 215, and an obfuscated password 220. The user credentials table 210 indicates that a user "Joe" has a stored password "ABCD" and obfuscation rule "Add 5" associated with his account. According to various embodiments, the system may grant access to the session if it receives each character of the user's stored password interspersed with the correct obfuscating characters. According to the received symbol and feedback table 215, the system authenticating the user's access determines that password symbols 'A' and 'C' will be the generating symbols for the first session access. The system generates obfuscating symbols "F" and "H" by applying the obfuscation rule to generating symbols 'A' and 'C,' respectively. The obfuscation symbol 'F' is inserted at the symbol position following the generating character 'A' (symbol position 1) in the password sequence. Similarly, obfuscating symbol 'H' is inserted at symbol position 4, the position immediately following the generating character 'C'. The resulting obfuscated password 220 is "AFBCHD." Lastly, received symbol and feedback table 215 indicates that the system will provide feedback, prompting the user to apply the encryption rule to his input sequence, after receiving generating character's 'A' and 'C'.

The second session access 225 illustrates another session access for the same user. This scenario illustrates a session access where no obfuscating symbols were selected by the authenticating system. Consequently received symbol and feedback table 235 shows that no feedback indicator will be provided, and the obfuscated password 240 will be the same as the stored password shown in user credentials table 210.

The third session access 245 illustrates a scenario where symbols from the sequence of obfuscating symbols are included in the set of generating symbols. Received symbol and feedback table 255 shows that the obfuscating symbols 'G' and 'H' are used to generate the encrypting symbols 'L' and 'M', respectively. This scenario serves to illustrate the idea that the authenticating system can produce an obfuscated password 260 of arbitrary length by including symbols from the sequence of obfuscating symbols in the set of generating symbols.

The fourth session access 265 illustrate a scenario where each of the symbols in the stored password is used as a generating symbol. Consequently, received symbol and feedback table 275 shows that the system will provide a feedback indicator after receiving each symbol of the stored password. According to this scenario, the encrypted password 280 will be twice as long as the stored password.

Figure 3:
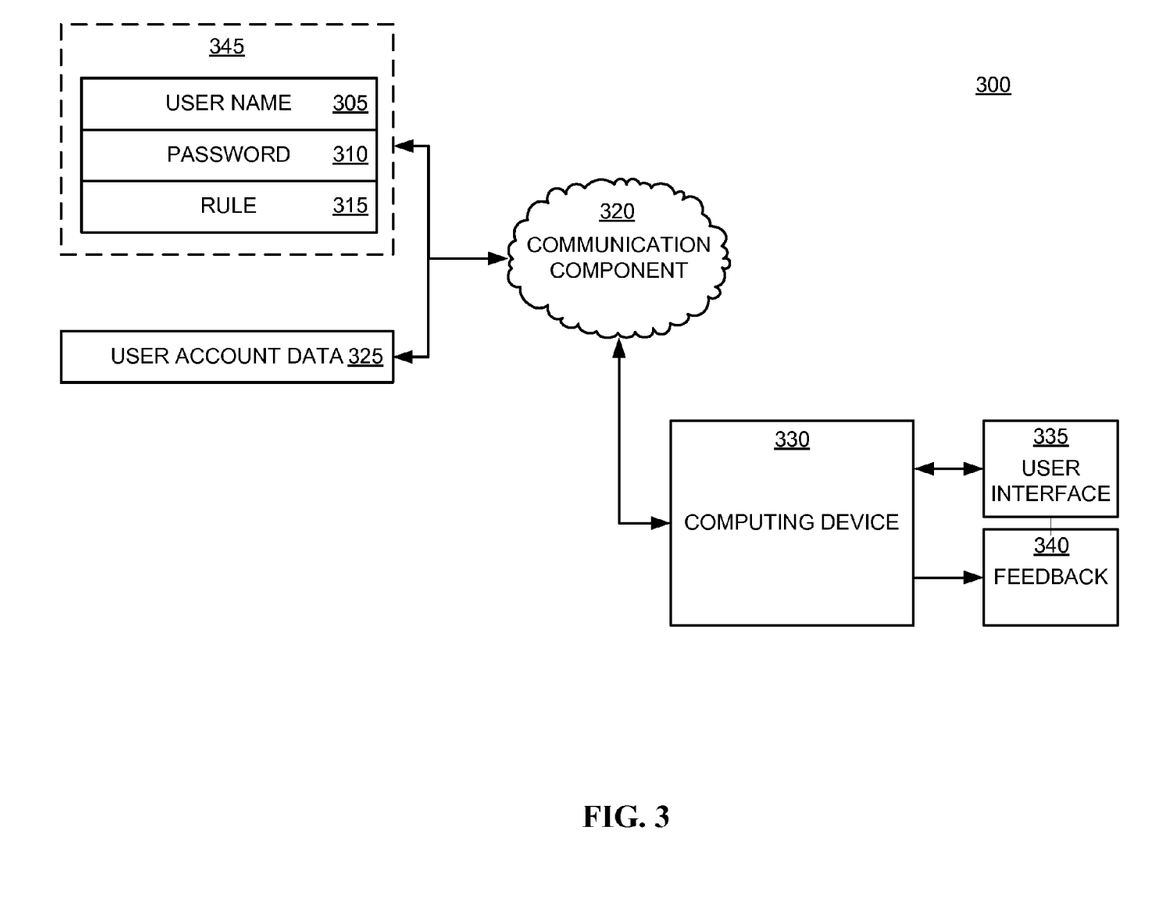
FIG. 3 depicts a system for generating an obfuscated password, according the various embodiments.

FIG. 3 depicts a system 300 for generating an obfuscated password, according the various embodiments. The system 300 includes computing device 330 having a user interface 335 and a feedback device 340, and access to user account data 325 and user credentials 345 via a communication component 320. The user interface 335 may be an input device (e.g., a keypad, keyboard, or touch screen) configured to allow a user to input individual symbols of a password sequence. The user interface 335 may also include output devices, such as a display, a speaker, or a haptic actuator. The feedback device 340 may be one or more of the output devices or a distinct visual, audio, or tactile device or mechanism (e.g., a motor with an unbalanced weight attached to its shaft, audio device, or a display) configured to provide a feedback indicator to the user. Any type of haptic actuator known in the art may be employed.

According to various embodiments, the computing device 330 may include a password obfuscating module or device to receive a password sequence from the user interface 335, and provide a feedback indicator output to the feedback device 340. The password obfuscating module or device may be configured to access a user credentials 345 and user account data 325 via the communication component 320. The communications component 320 may a computer bus located within the computing device 330, or it may be an interface to a remote computing system. The user credentials 345 and user account data 235 may be stored internally in computing device 330 or on a remote computing device. The computing device 330 may include a password validating module or device configured to retrieve the stored password 310 and obfuscating rule 315 associated with user credentials 345, and perform operations or execute code embodying various aspects of the method described herein to determine whether to grant a user 305 access to the user account data 325. In some embodiments, all or part of the operations or method steps described herein may be executed on a remote computing device, and access to user account data 325 may be communicated by computer device 330.

Figure 4:
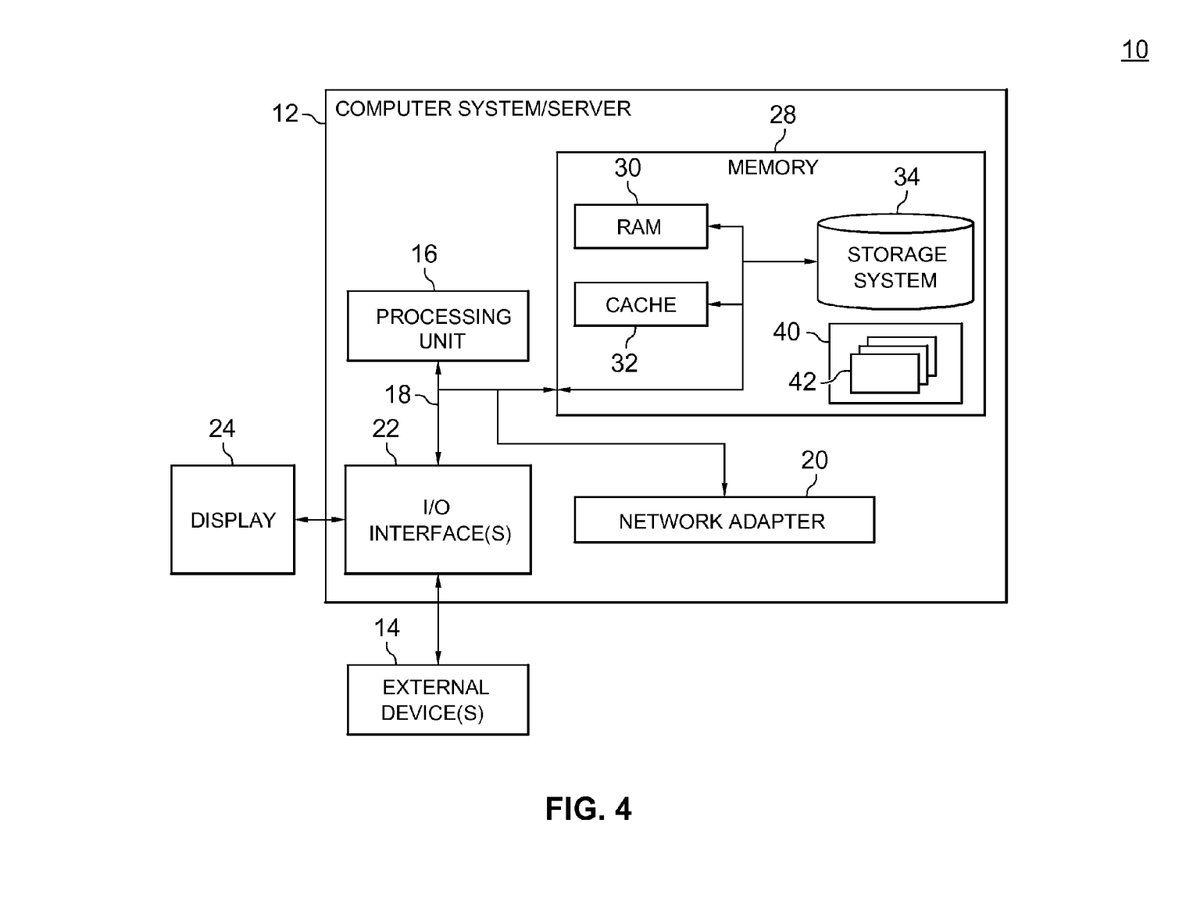
FIG. 4 depicts a block diagram of a computing system used to obfuscate an electronic password, according to various embodiments.

As shown in FIG. 4, computer system 12 in the computing system used to obfuscate an electronic password 10 is shown in the form of a general-purpose computing device. In various embodiments, the computer system 12 can be an automatic teller machine, a personal computer, a laptop computer, tablet computer, a cellular or other telephone of any kind, a building alarm system requiring a security code input, a point-of-sale terminal, a safe, an automobile, or any other device requiring a security code input. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 312, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. In various embodiments, the program modules may include a first module to generate an obfuscated password and a second module to validate a password received or input by a user.

Computer system/server 12 may also communicate with one or more external devices 14 such as a keyboard, a pointing device, a display 24, digital camera 25, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc. In various embodiments, the computer system 12 can include one or more feedback indicators, such as the display 24, a speaker, or a haptic actuator.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for obfuscating an electronic password from visual surveillance each time a user accesses a session, comprising:

receiving, from the user, a password symbol of the electronic password;

generating, by a computing device in response to receiving the password symbol in a session access attempt, an obfuscated password derived from the electronic password using an obfuscation rule when the password symbol is a first symbol of the electronic password, wherein the obfuscated password comprises symbols of the electronic password and a unique sequence of at least one obfuscating symbol generated from both the obfuscation rule and a randomly selected symbol of the electronic password, wherein the unique sequence of at least one obfuscating symbol is generated for each session access attempt by applying the obfuscation rule to a set of generating symbols;

determining, in response to receiving a password symbol, whether to provide a feedback indicator, the feedback indicator corresponding to an instruction to enter an obfuscating symbol derived from the received password symbol according to both the feedback indicator and the obfuscation rule, wherein providing the feedback indicator includes vibrating an electronic device and the feedback indicator is selected from a group consisting of auditory cues, haptic cues, and visual cues;

providing, in response to determining to provide the feedback indicator, the feedback indicator to the user;

obtaining, from the user in response to providing the feedback indicator, a second password symbol; and determining whether there are more password symbols to obtain;

repeating the determining, the providing, and the obtaining when there are more password symbols to obtain; and granting access to the session when there are no more password symbols to obtain and the obfuscated password has been received.

2. The method of claim 1, wherein generating the obfuscated password comprises determining a unique sequence of obfuscating symbols for the obfuscated password for each session access attempt.

3. A system for obfuscating an electronic password, the system comprising:

one or more computing nodes having a memory and a processor; and a computer readable storage medium of the one or more computing nodes having program instructions embodied therewith, the program instructions executable by the processor to cause the system to:

receive, from the user, a password symbol of the electronic password;

generate, in response to receiving the password symbol in a session access attempt, an obfuscated password derived from the electronic password using an obfuscation rule when the password symbol is a first symbol of the electronic password, wherein the obfuscated password comprises symbols of the electronic password and a unique sequence of at least one obfuscating symbol generated from both the obfuscation rule and a randomly selected symbol of the electronic password, wherein the unique sequence of at least one obfuscating symbol is generated for each session access attempt by applying the obfuscation rule to a set of generating symbols;

determine, in response to receiving a first password symbol, whether to provide a feedback indicator, the feedback indicator corresponding to an instruction to enter an obfuscating symbol derived from the received password symbol according to both the feedback indicator and the obfuscation rule, wherein the feedback indicator includes a vibration of an electronic device and the feedback indicator is selected from a group consisting of auditory cues, haptic cues, and visual cues;

provide, in response to determining to provide the feedback indicator, the feedback indicator to the user;

obtain, from the user in response to providing the feedback indicator, a second password symbol;

determine whether there are more password symbols to obtain;

repeat the determining, the providing, and the obtaining when there are more password symbols to obtain; and grant access to a session when there are no more password symbols to obtain and the obfuscated password has been received.

4. The system of claim 3, wherein the program instructions are further executable by the processor to cause the system to determine a unique sequence of obfuscating symbols for the obfuscated password for each session access attempt.

5. A computer program product for obfuscating an electronic password, the computer program product comprising a computer readable storage medium having program instructions embodied therewith, wherein the computer readable storage medium is not a transitory signal per se, the program instructions executable by a processing circuit to cause the processing circuit to perform a method comprising:

receiving, from the user, a password symbol of the electronic password;

generating, by a computing device in response to receiving the password symbol in a session access attempt, an obfuscated password derived from the electronic password using an obfuscation rule when the password symbol is a first symbol of the electronic password, wherein the obfuscated password comprises symbols of the electronic password and a unique sequence of at least one obfuscating symbol generated from both the obfuscation rule and a randomly selected symbol of the electronic password, wherein the unique sequence of at least one obfuscating symbol is generated for each session access attempt by applying the obfuscation rule to a set of generating symbols;

determining, in response to receiving a password symbol, whether to provide a feedback indicator, the feedback indicator corresponding to an instruction to enter an obfuscating symbol derived from the received password symbol according to both the feedback indicator and the obfuscation rule, wherein providing the feedback indicator includes vibrating an electronic device and the feedback indicator is selected from a group consisting of auditory cues, haptic cues, and visual cues;

providing, in response to determining to provide the feedback indicator, the feedback indicator to the user;

obtaining, from the user in response to providing the feedback indicator, a second password symbol;

determining whether there are more password symbols to obtain;

repeating the determining, the providing, and the obtaining when there are more password symbols to obtain; and granting access to the session when there are no more password symbols to obtain and the obfuscated password has been received.

6. The computer program product of claim 5, wherein generating the obfuscated password comprises determining a unique sequence of obfuscating symbols for the obfuscated password for each session access attempt.

* * * * *